F. H. ROYCE.
AIRCRAFT PROPELLER.
APPLICATION FILED SEPT. 19, 1916.
1,223,330.
Patented Apr. 17, 1917.
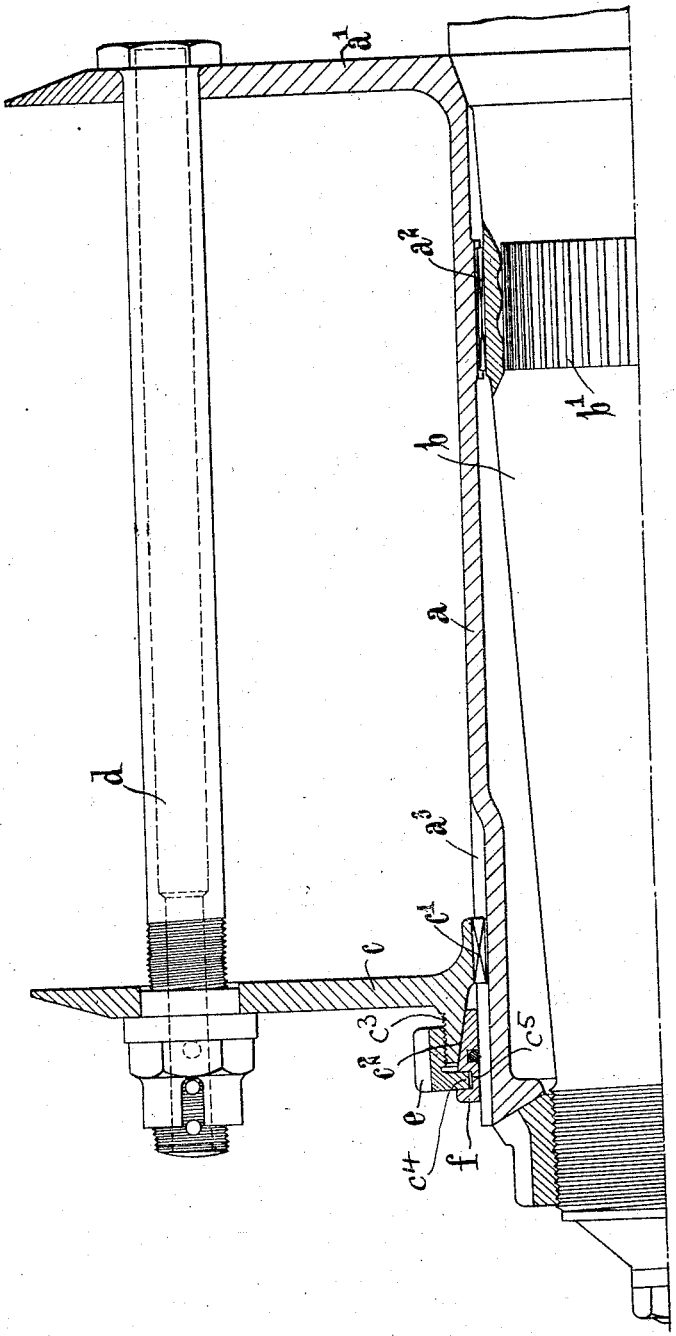
Inventor
Frederick Henry Royce
by R. Haddan
his Attorney

UNITED STATES PATENT OFFICE.

FREDERICK HENRY ROYCE, OF DERBY, ENGLAND, ASSIGNOR TO ROLLS ROYCE LIMITED, OF DERBY, ENGLAND.

AIRCRAFT-PROPELLER.

1,223,330. Specification of Letters Patent. Patented Apr. 17, 1917.

Application filed September 19, 1916. Serial No. 121,072.

*To all whom it may concern:*

Be it known that I, FREDERICK HENRY ROYCE, a subject of the King of England, residing at Derby, in England, engineer, have invented certain new and useful Improvements Relating to Aircraft-Propellers, of which the following is a specification.

This invention relates to aircraft propellers and consists of improved means for mounting said propellers (which are usually constructed of wood) on the hubs which are adapted to be mounted on the driving shafts, and it has for its object to relieve the bolts, by which the boss of the propeller is fixed and secured to the hub, from any bending moment due to the driving stress.

According to the present invention, the hub comprises a sleeve having two flanges one of which is integral therewith and the other one detachably mounted on said sleeve and secured against relative rotary motion thereto by means of splines or serrations. The said detachable flange is also prevented from rocking in a plane perpendicular to the axis of the sleeve by means which may comprise a split externally coned ring mounted on the sleeve and forced into an internally coned portion of the boss of the flange by a nut screwed on to the outside of said boss so that said ring operates to lock the detachable flange to the sleeve by a wedging action.

In the accompanying drawing which illustrates this invention, the figure is a half sectional elevation, the boss of the propeller being omitted for the sake of clearness.

The sleeve $a$ constituting the hub has one flange $a^1$ formed integrally therewith. The other flange $c$ is detachably mounted on the sleeve $a$ and is provided with serrations $c^1$ in the bore of one end of its boss, these serrations engaging corresponding serrations $a^3$ on the exterior of the sleeve so that although the flange may slide endwise in relation to the sleeve to accommodate small differences in the thicknesses of the propeller boss it can have no rotary movement independently of said sleeve. The detachable flange $c$ is secured in the desired position relatively to the flange $a^1$ and the propeller is prevented from rocking in a plane perpendicular to the axis of the hub, by forming an internal cone $c^2$ at the outer end of the boss of said flange $c$ and forcing a split or divided coned ring $f$, loosely mounted on the sleeve, into close engagement with said internal cone $c^2$, said ring $f$ being operated and locked by means of a nut $e$ which is screwed on to threads $c^3$ formed on the exterior of the boss and is provided with a flange $c^4$ which engages a recess $c^5$ in the coned ring $f$.

By this means the drive is transmitted from hub to propeller equally at each end and puts no stress on the securing bolts $d$ other than a shearing stress.

The complete hub is mounted on the driving shaft $b$ in any suitable manner and the drive is preferably communicated by the engagement of serrations $a^2$ on the sleeve $a$ with serrations $b^1$ on the shaft.

What I claim as my invention and desire to secure by Letters Patent of the United States is:—

1. An air-craft propeller hub comprising a sleeve having exterior longitudinal serrations, a flange integral with said sleeve, a second flange spaced therefrom and having a boss interiorly serrated to engage the serrations on the sleeve, an interior coned surface on said flange boss, an exteriorly coned ring loosely mounted on the sleeve and adapted to engage said interior coned surface and a nut screwed onto the boss and adapted to force and hold the coned ring in such engagement.

2. An air-craft propeller hub comprising a sleeve, a flange integral therewith a detachable flange mounted on the sleeve, splines or equivalents adapted to prevent rotary motion of the flange on the sleeve and means for locking said detachable flange on the sleeve and preventing it from rocking in a plane perpendicular to the axis thereof said means comprising a split externally coned ring mounted on the sleeve, an interiorly coned portion on the flange adapted to receive said ring and a nut screwed onto the flange and engaging said ring.

In witness whereof I have signed this specification in the presence of two witnesses.

FREDERICK HENRY ROYCE.

Witnesses:
ALBERT GEORGE ELLIOTT,
SARAH MABEL WOLVERSON.